(12) United States Patent
Westre et al.

(10) Patent No.: US 7,491,289 B2
(45) Date of Patent: Feb. 17, 2009

(54) METHODS OF FORMING METAL FOIL PLY REPLACEMENT IN COMPOSITE STRUCTURES

(75) Inventors: Willard N. Westre, Bellevue, WA (US); David W Evans, Kent, WA (US); Edward Li, Seattle, WA (US); Marc J. Piehl, Renton, WA (US); Eric Sager, Seattle, WA (US)

(73) Assignee: The Boeing Company, Chicago, IL (US)

( * ) Notice: Subject to any disclaimer, the term of this patent is extended or adjusted under 35 U.S.C. 154(b) by 58 days.

(21) Appl. No.: 11/530,582

(22) Filed: Sep. 11, 2006

(65) Prior Publication Data

US 2007/0000596 A1    Jan. 4, 2007

Related U.S. Application Data

(63) Continuation of application No. 10/650,231, filed on Aug. 28, 2003, now Pat. No. 7,115,323.

(51) Int. Cl.
| | |
|---|---|
| B29C 65/00 | (2006.01) |
| B32B 37/00 | (2006.01) |
| B32B 3/00 | (2006.01) |
| H05K 13/04 | (2006.01) |
| E04F 13/08 | (2006.01) |
| B64C 1/00 | (2006.01) |

(52) U.S. Cl. .................. 156/300; 156/293; 156/297; 156/298; 156/299; 156/304.1; 428/58; 244/133

(58) Field of Classification Search .................. 156/298, 156/307.1, 307.3, 307.7, 293, 297, 299, 300, 156/304.1; 428/58, 60, 57; 244/133
See application file for complete search history.

(56) References Cited

U.S. PATENT DOCUMENTS 2,397,415 A    3/1946   Ghez et al.

(Continued)

FOREIGN PATENT DOCUMENTS

WO    WO 00/56541    *    9/2000

(Continued)

OTHER PUBLICATIONS

Woo, E. M. et al.; "Viscoelastic characterization of high performance epoxy matrix composites," Polymer Composites, Aug. 1991, Wiley, vol. 12, Iss. 4, p. 273.*

(Continued)

*Primary Examiner*—Jeff H Aftergut
*Assistant Examiner*—Brian R Slawski
(74) *Attorney, Agent, or Firm*—Lee & Hayes, PLLC

(57) ABSTRACT

Laminate structures and methods for forming same are disclosed. In one embodiment, a laminate structure includes a metal-polymer composite lamina. The metal-polymer composite lamina has a first face and a second face spaced apart, and extends to a terminal edge. The lamina includes a ply of fiber-reinforced polymer that extends between the first face and the second face and has an interior edge. The interior edge defines at least one cutout. A ply of metal foil extends between the first face and the second face substantially from the interior edge filling the at least one cutout.

20 Claims, 4 Drawing Sheets

U.S. PATENT DOCUMENTS

| | | | |
|---|---|---|---|
| 5,160,771 A * | 11/1992 | Lambing et al. | 428/57 |
| 5,344,686 A * | 9/1994 | Heubert | 428/75 |
| 5,578,384 A | 11/1996 | Kingston | |
| 5,693,157 A | 12/1997 | Kingston | |
| 5,866,272 A | 2/1999 | Westre et al. | |
| 6,039,832 A | 3/2000 | McCarville | |
| 6,114,050 A | 9/2000 | Westre et al. | |
| 6,194,081 B1 * | 2/2001 | Kingston | 428/608 |
| 6,320,118 B1 | 11/2001 | Pridham et al. | |
| 6,465,110 B1 | 10/2002 | Boss et al. | |

FOREIGN PATENT DOCUMENTS

| | | |
|---|---|---|
| WO | WO0056541 | 9/2000 |

OTHER PUBLICATIONS

3M Company, "Scotch-Weld Structural Adhesive Film AF 163-2," Nov. 2004, p. 1.*

* cited by examiner

METHODS OF FORMING METAL FOIL PLY REPLACEMENT IN COMPOSITE STRUCTURES

CROSS-REFERENCE TO RELATED APPLICATIONS

This patent application is a divisional application of commonly-owned U.S. patent application Ser. No. 10/650,231, now U.S. Pat. No. 7,115,323 entitled "Titanium Foil Ply Replacement In Layup of Composite Skin" filed on Aug. 28, 2003, which application is incorporated herein by reference.

FIELD OF THE INVENTION

This invention relates generally to aircraft skin panels of laminate structure and, more specifically, to methods of forming metal foil plys in composite laminates to impart strength.

BACKGROUND

Airframe manufacturers have found that skins of graphite, boron, or a blend of ugraphite and boron composite (collectively "polymeric composite") unidirectional tape can be strengthened by the introduction of titanium foil between laid up plies of polymeric composite unidirectional tape. For example, U.S. Pat. No. 5,866,272 to Westre et al., incorporated by this reference, is one of several patents teaching the placement of titanium foil between plies of polymeric composite unidirectional tape.

The resulting skin including a titanium foil makes up for a bearing deficiency of non-titanium containing polymeric composite panels, which ordinarily will not bear loads or hold pins well. In addition, composite construction is typically one-third of the density of titanium. Titanium has a relatively low fatigue strength and relatively high crack growth rates. Introducing titanium foil to the polymeric composite skins yields a resulting hybrid that exploits the strengths of polymeric composite and titanium construction. With the introduction of sufficient titanium foil, the resulting skin approaches and can surpass the strength properties of either material alone.

Traditionally, adding plies of polymeric composition has made pad-ups for joints and higher-loaded areas of composite panels. The added plies are laid up in balanced and symmetric manner to form a ramp at the site of the pad-up. These pad-ups add strength at points in the skin without the addition of weight by uniform addition of material across the skin. Recently, the virtues of introduction of titanium foil have been achieved by padding up by adding titanium foil plies.

The selective introduction of titanium foil at places of greater pin bearing loads causes a resulting skin of non-uniform thickness. The transition in thickness from polymeric composite skin alone to reinforced hybrid composite skin is known as a ramp. Fastening parts to pad-ups typically requires complex machining and close tolerances to conform to the ramp. Such considerations mean greater expense in manufacturing.

Additionally, as the thickness of the composite skin increases, the bolt bending stresses increase, consequently decreasing the strength of skin at the bolthole. For this reason, minimizing of the pad-up is advantageous. Thus, there is an unmet need in the art for a method of introducing titanium foil to a polymeric composite lay-up in a manner to reduce the pad-up and ramp length.

SUMMARY

The present invention is directed to laminate structures and methods for laying up laminate structures. In one embodiment, a method of laying up a laminate structure includes impregnating a ply of fiber with a first resin; impregnating a ply of metal foil with a second resin; laying up an interrupted lamina of the ply of fiber, the interrupted layer having a terminal edge and being interrupted by the presence at least one cutout defined in the lamina; and laying up the ply of metal foil to substantially fill the cutouts defined in the interrupted lamina.

In accordance with alternate aspects of the invention, the fiber-reinforced polymer includes a fiber selected from the group consisting of aramids, polyolefins, glass, carbon, boron, and ceramics.

In accordance with further aspects of the invention, the metal foil includes a metal selected from the group consisting of alloys of titanium, alloys of aluminum, and alloys of iron.

In accordance with still other aspects of the invention, the polymer may include a thermosetting or a thermoplastic resin, or a hybrid polymer resin with qualities of both resins.

In accordance with additional aspects of the invention, the laminate structure may further include a polymer lamina. The polymer lamina has a third face and a fourth face spaced apart. The polymer lamina includes a ply of fiber-reinforced polymer extending between the third face and the fourth face and extending substantially to the terminal edge.

BRIEF DESCRIPTION OF THE DRAWINGS

Embodiments of the present invention are described in detail below with reference to the following drawings.

DETAILED DESCRIPTION

The present invention generally relates to laminate structures including a titanium layer, and methods of laying up the same. Many specific details of certain embodiments of the invention are set forth in the following description and in FIGS. 1-3 to provide a thorough understanding of such embodiments. One skilled in the art, however, will understand that the present invention may have additional embodiments, or that the present invention may be practiced without several of the details described in the following description.

By way of overview, in one embodiment in accordance with the present invention, a laminate structure includes a metal-polymer composite lamina. The metal-polymer composite lamina has a first face and a second face spaced apart, and extends to a terminal edge. The lamina includes a ply of fiber-reinforced polymer that extends between the first face and the second face and has an interior edge. The interior edge defines at least one cutout. A ply of metal foil extends between the first face and the second face substantially from the interior edge filling the at least one cutout.

Figure 1:
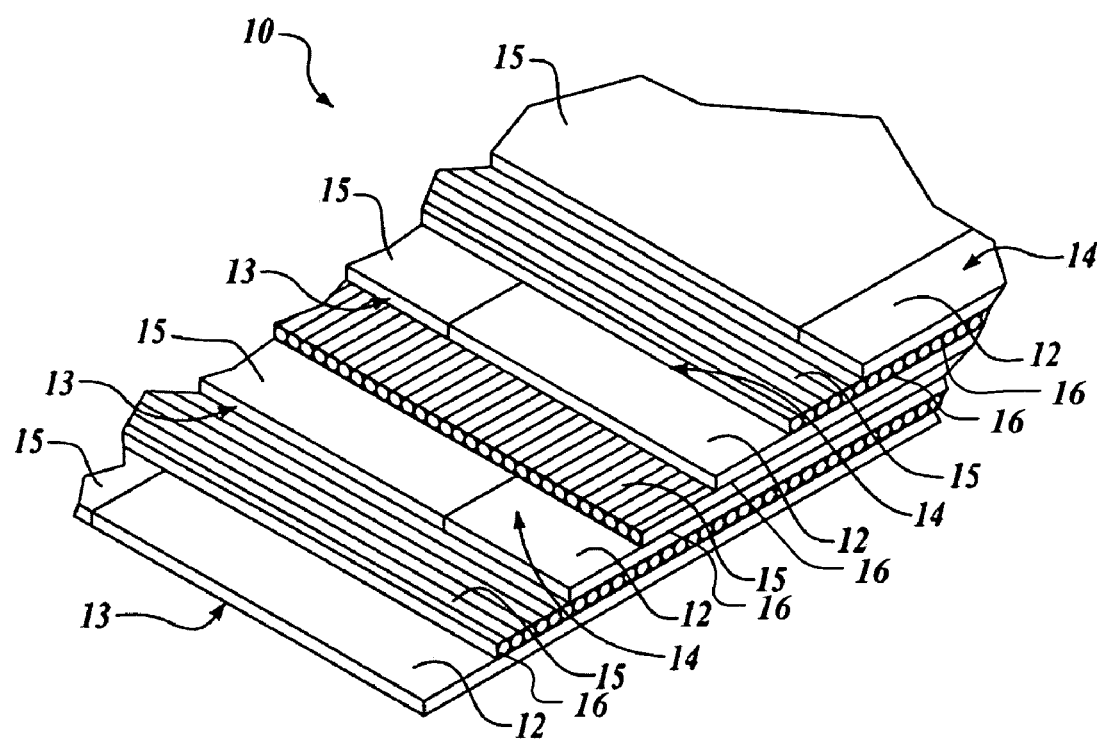
FIG. 1 is an isometric partial sectional view of several laminae of a TiGr laminate in accordance with an embodiment of the present invention.

FIG. 1 is an isometric partial sectional view of several laminae of a TiGr laminate 10 in accordance with an embodiment of the present invention. In this embodiment, the laminate 10 includes several laminae of titanium foil 12 interleaved with several laminae of fiber-reinforced polymer 15. The fibers of the fiber-reinforced polymer 15 may be formed of a variety of known materials, including, for example, aramids, polyolefins, glass, carbon, boron, ceramics, or any other suitable fiber material, and may be disposed within a resin. Throughout this application, resin includes either a thermosetting or a thermoplastic resin, or a hybrid polymer resin with qualities of both resins. Alternately, the fibers may simply be eliminated within a ply to form a gap between the graphite fiber and the metal foil. Similarly, the metal layer 12 may be formed of a variety of metallic materials, including, for example, copper, titanium, aluminum, alloys of titanium (e.g. Ti-6Al-4V, Ti-15V-3Cr-3Sn-3Al and Ti-15Mo-3Al-3Nb), alloys of aluminum, alloys of iron, or any other suitable metallic materials. One purpose of the introduction of the titanium foil 12 is to enhance the pin load bearing ability of a panel such as an aircraft skin, for example, around the landing gear attachment points. As further shown in FIG. 1, the adjacent layers of fiber-reinforced polymeric material 15 and titanium-containing layers 13 may be bonded with a suitable adhesive layer 16, including, for example, a thermo-setting epoxy resin or other suitable adhesive.

Figure 2:
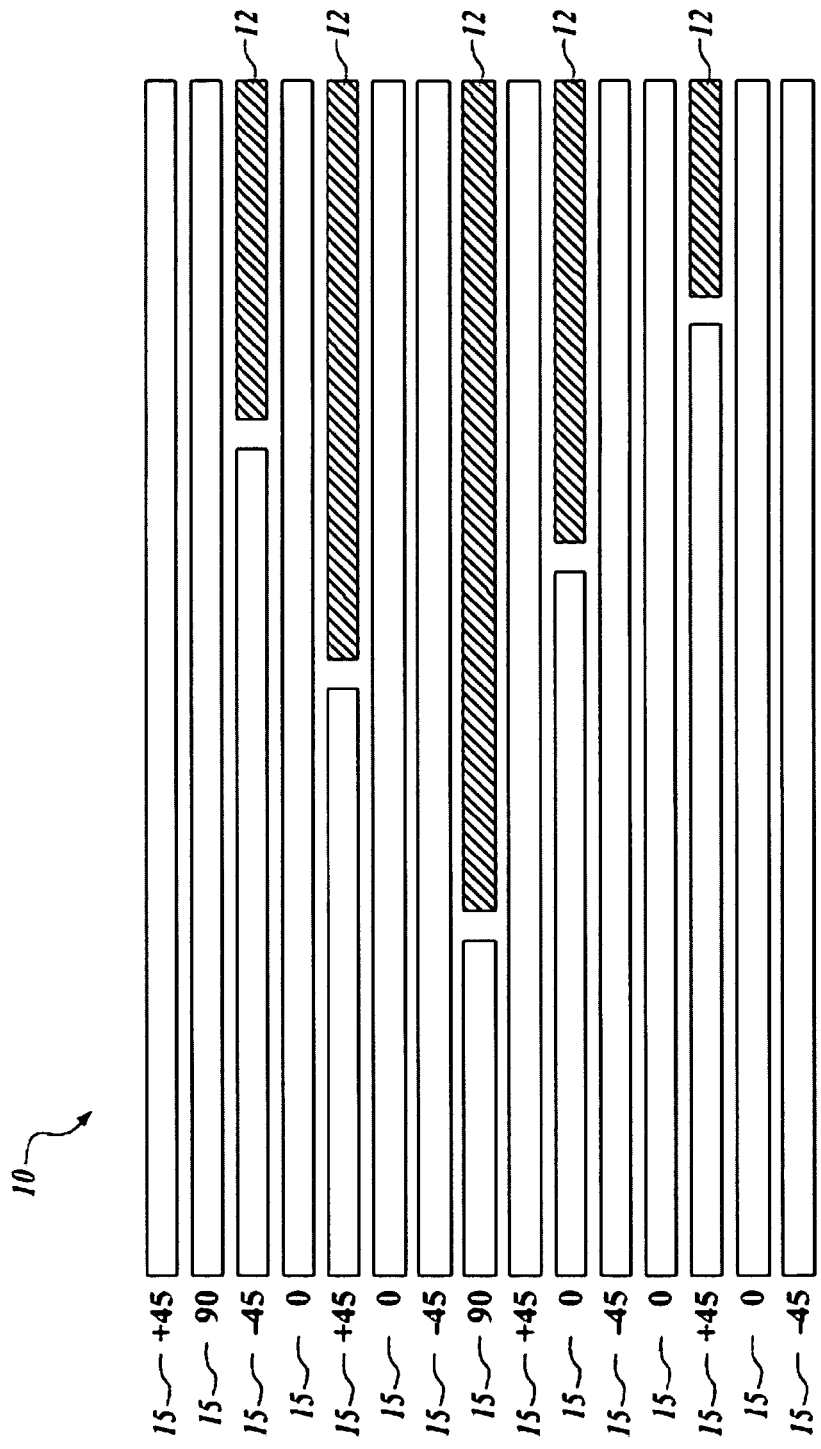
FIG. 2 is a side cross-sectional view of an exemplary lay up of a TiGr laminate in accordance with an embodiment of the present invention.
Figure 3A:
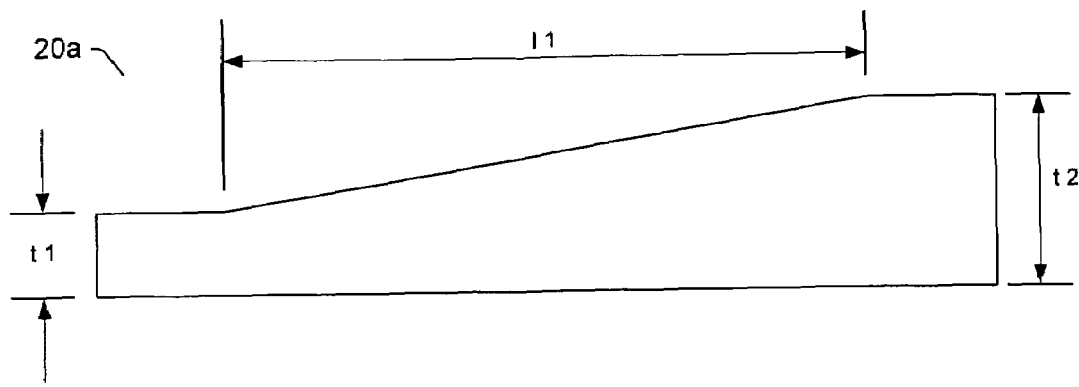
FIG. 3A is a pad-up laminate structure as described in the prior art.
Figure 3B:
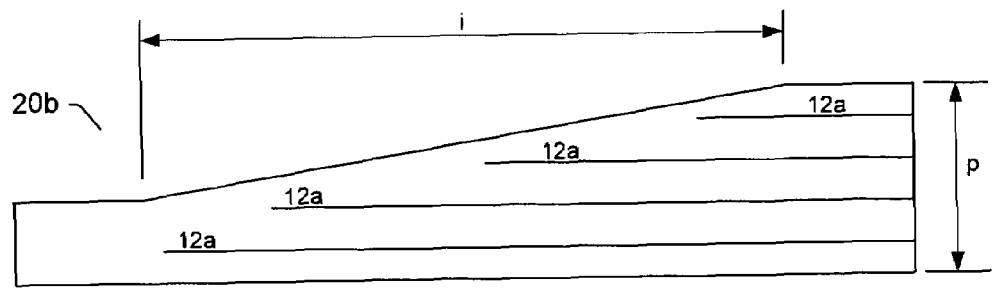
FIG. 3B is a pad-up laminate structure using interleafed metal layers as described in the prior art.
Figure 3C:
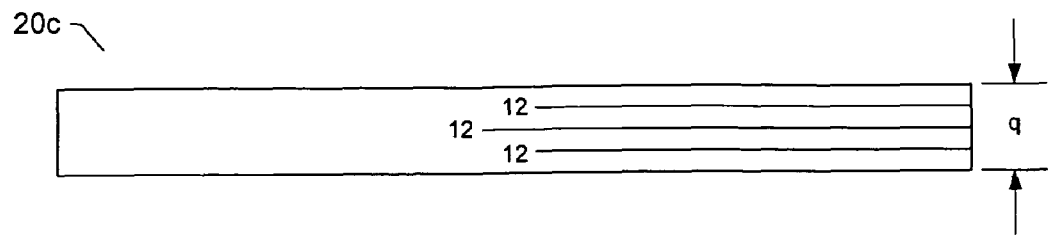
FIG. 3C is a laminate structure of uniform thickness using interrupted metal layers in accordance with embodiments of the present disclosure.
Figure 3D:
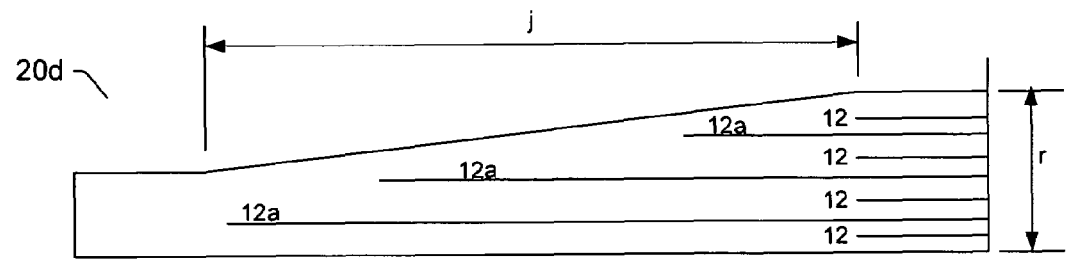
FIG. 3D is a padded-up laminate structure comprising both interleaved metals layers and interrupted metal layers in accordance with embodiments of the present disclosure.
Figure 3E:
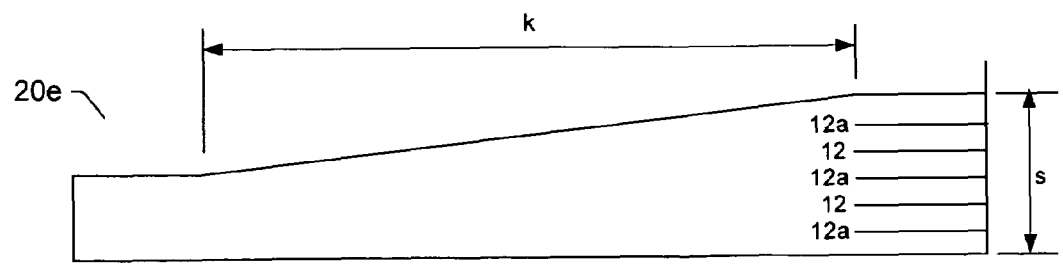
FIG. 3E is a padded-up laminate structure comprising both interleaved metals layers and interrupted metal layers in accordance with another embodiment of the present disclosure.

FIG. 2 is a side cross-sectional view of an exemplary lay up of a TiGr laminate 10 in accordance with an embodiment of the present invention. Unlike the Westre patent, which teaches interleaving titanium foil 12 with fiber-reinforced polymer 15 resulting in a pad-up in the skin, the inventive laminate structure 10 includes a lay-up that interrupts several graphite lamina 15 at points of greater pin load bearing requirements, resulting in a uniform thickness, as described more fully below. As further illustrated in FIG. 2, the layers of fiber-reinforced polymer 15 and the layers of interrupted fiber-reinforced polymer 15 with interleaving titanium foil 12 are oriented at angles of approximately −45 degrees, approximately +45 degrees, approximately 0 degrees, or approximately 90 degrees in one particular embodiment, no two adjacent layers are orientated at the same angle.

As best shown in FIG. 1, in laying up a single lamina 13, areas requiring specific titanium reinforcement are designated. At the designated areas, a cutout 14 is formed. The cut-out 14 may be formed, for example, by removing the fiber-reinforcing polymer 15 up to an interior edge, or by simply laying up fiber-reinforcing polymer 15 up to an interior edge, leaving the formed cutout 14. Suitable lay up devices for forming the cutouts 14 include, for example, conventional contour tape-laminating machines, such as those manufactured by Cincinnati Machine, Inc. The lamina 13 is then completed with titanium foil 12 to substantially fill each cutout 14.

As further shown in FIG. 1, where multiple layers 13 are to be interrupted, it may be advantageous to stagger interior edges of the cutouts 14 in order to prevent the overlay of two or more interior edges. Because of the distinct properties of the fiber-reinforced polymer 15 and the titanium foil 12, the staggering of the interior edges spreads the transition area between the fiber-reinforced polymer 15 and the titanium foil 12 in the TiGr laminate 10. Additionally, the interleafing of titanium foil 12 using one or more cutouts 14 to create a local additional lamina may advantageously allow the adjacent fiber-reinforced polymer layers 15 to continue across the titanium foil 12. The addition of the lamina causes the pad up of the thickness of the laminate 10. As will readily be appreciated by those skilled in the art, the distinct strategies of interleafing titanium foil 12 to create a new lamina as disclosed in the patent issued to Westre et al., and interrupting the fiber-reinforced polymer 15 in a single lamina 13 with a titanium foil 12 in accordance with the present invention may yield distinct properties in the resulting laminate 10. In accordance with alternate embodiments of the invention, a laminate 10' may be built with both strategies to optimize the pin load bearing performance.

FIG. 3 is a comparison of profiles of pad-ups of prior art laminate structures and laminate structures of comparable strength in accordance with embodiments of the present invention. Specifically, a pad-up laminate 20 in accordance with the prior art is shown. The laminate pad-up 20a is characterized by a transition from a first non-titanium containing skin thickness t1 to a full pad-up (or second non-titanium containing skin thickness) t2 by a characteristic ramp having a length 11. Westre et al. teaches a prior art laminate pad-up 20b where all of the titanium foil is simply interleaved titanium foil 12a, rather than added in as interrupted laminae of titanium foil 12 as taught by the present disclosure. Thus, the prior art pad-up of Westre et al. has a ramp with greatest length i and greatest thickness p. In contrast, a laminate 20c made exclusively with the inventive method of interrupting the fiber-reinforced polymer 15 with titanium foil 12 formed in a cutout 14 in the polymer layer 13 as described herein, has no appreciable pad-up, thus eliminating the ramp, and having a thickness q that is substantially the same as the surrounding skin.

With continued reference to FIG. 3, two hybrid laminates, 20d and 20e, show alternate configurations having both the interleafed titanium foil layers 12a and the inventive layers 13 having a cutout 14 and including titanium foil 12 within the cutout 14. Where the interleaves extend nearly to the anticipated profile of the ramp, the laminate 20d results having a ramp of j in length and a thickness of r. Generally, the ramp lengths j, k in the laminate structures 20d and 20e are shorter than the ramp lengths 1, i of the prior art laminate structures 20a and 20b. In one aspect of the present invention, the ramp length of the inventive laminate structures 20d, 20e may be decreased in proportion to the ratio of the number of interleaved titanium foils 12a to the total number of titanium foils 12 and 12a. Similarly, the thicknesses r, s of the pad-up of the laminate structures 20d and 20e are thinner the thicknesses t2, p of the pad-up of the prior art laminate structures 20a and 20b. Again, in a particular aspect of the present invention, the difference in thickness may be proportional to the ratio the number interleaved titanium foils 12a bears to the total number of titanium foils 12 and 12a.

Because titanium is more dense than fiber-reinforced polymer 15, savings in weight can be achieved by reducing the amount of titanium in the laminate structure by forming the titanium foil 12 within a cutout 14 in a layer 13, rather than allowing the interleaved titanium foil 12a to fully extend toward the profile of the ramp as practiced in the prior art. Interestingly, the profile of a ramp on a laminate 20e, has roughly the same length k as the ramp length j of the laminate 20d. Again, similarly, the profile of a ramp on a laminated 20e, has roughly the same thickness s as the thickness r of the laminate 20d. Thus, shortening the titanium foils 12a may result in a weight savings without significantly changing the pad-up profile.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method of laying up a laminate structure, the method comprising:
    forming a metal-polymer composite layer of substantially uniform thickness that non-interruptedly extends from a first face to a second face, the metal-polymer composite layer including:
        a first portion of non-metallic material including a first resin, the first portion interrupted by the presence of a first cutout; and
        a second portion of metallic material including a second resin, the second portion substantially filling the first cutout of the first portion, and the second resin being different from the first resin;
    forming a fiber-reinforced polymeric layer, the fiber-reinforced polymeric layer non-interruptedly extending from the first face to the second face along the metal-polymer composite layer;
    coupling the fiber-reinforced polymeric layer adjacent to the metal-polymer composite layer;
    forming a metal layer, the metal layer interruptedly extending along a portion of the fiber-reinforced polymeric layer from a third face to fourth face such that the laminate structure is of non-uniform thickness; and
    coupling the metal layer adjacent to the fiber-reinforced polymeric layer.

2. The method of claim 1, wherein the first portion includes a fiber-reinforced polymer selected from a group consisting of aramids, polyolefins, glass, carbon, boron, and ceramics.

3. The method of claim 1, wherein the second portion includes a metal selected from a group consisting of alloys of titanium, alloys of aluminum, and alloys of iron.

4. The method of claim 3, wherein the alloys of titanium are selected from a group consisting of (Ti-6Al-4V), (Ti-15V-3Cr-3Sn-3Al) and (Ti-15Mo-3Al-3Nb).

5. The method of claim 1, wherein the first resin and the second resin are selected from a group consisting of thermo-setting resin, a thermoplastic resin, and a hybrid polymer resin.

6. The method of claim 1, wherein the fibers of the metal-polymer composite layer and the fibers of the fiber-reinforced polymeric layer are oriented in a direction selected from the group consisting of approximately zero degrees, approximately ninety degrees, approximately positive forty-five degrees, and approximately negative forty-five degrees.

7. The method of claim 1, further comprising applying an adhesive resin between the metal-polymer composite layer and the fiber-reinforced polymeric layer.

8. The method of claim 7, wherein the adhesive resin between the metal-polymer composite layer and the fiber-reinforced polymeric layer, is a thermo-setting epoxy resin.

9. The method of claim 1, wherein the first portion further includes a second cutout, the second cutout substantially filled by a third portion of metallic material including the second resin.

10. The method of claim 9, wherein the third portion includes a metal selected from a group consisting of alloys of titanium, alloys of aluminum, and alloys of iron.

11. The method of claim 10, wherein the third portion includes an alloys of titanium selected from a group consisting of (Ti-6Al-4V), (Ti-15V-3Cr-3Sn-3Al) and (Ti-15Mo-3Al-3Nb).

12. The method of claim 9, wherein:
    an adhesive resin is applied between the first portion and the second portion; and
    an adhesive resin is applied between the first portion and the third portion.

13. The method of claim 11, wherein the first cutout and the second cutout are non-coterminous.

14. A method of forming a laminate structure, comprising:
    forming a metal-polymer composite layer of substantially uniform thickness, the metal-polymer composite layer including:
        a first portion of non-metallic material interrupted by the presence of a first cutout;
        a second portion of metallic material including substantially filling the first cutout of the first portion; and
    forming a fiber-reinforced polymeric layer, the fiber-reinforced polymeric layer non-interruptedly extending along the metal-polymer composite layer;
    forming a metal layer, the metal layer extending along a portion of the fiber-reinforced polymeric layer such that the laminate structure is of non-uniform thickness;
    coupling the fiber-reinforced polymeric layer adjacent to the metal-polymer composite layer; and
    coupling the metal layer adjacent to the fiber-reinforced polymeric layer.

15. The method of claim 14, wherein the first portion includes a fiber selected from a group consisting of aramids, polyolefins, glass, carbon, boron, and ceramics; and wherein the second portion includes a metal selected from a group consisting of alloys of titanium, alloys of aluminum, and alloys of iron.

16. The method of claim 15, wherein the alloys of titanium are selected from a group consisting of (Ti-6Al-4V), (Ti-15V-3Cr-3Sn-3Al) and (Ti-15Mo-3Al-3Nb).

17. The method of claim 14, wherein the metal-polymer composite layer has non-tapered ends.

18. A method of forming a laminate structure, comprising:
    forming a region, wherein forming the region includes:
        forming a first layer that has a first face and a second face spaced apart from the first face, the first layer extending to a terminal edge and includes a first portion having a non-metallic material, the first portion defining at least one cutout region, the first layer further including a second portion of a metallic material formed within the at least one cutout region;
        forming a second layer adjacent the first layer that non-interruptedly extends along the first layer from the first face to the second face, the second layer extending to the terminal edge and formed of a non-metallic material; and forming a third layer adjacent the second layer that interruptedly extends along a portion of the second layer, the third layer formed of a metallic material.

19. The method of claim 18, wherein the first layer is of substantially uniform thickness.

20. The method of claim 19, wherein the first portion includes a fiber selected from a group consisting of aramids, polyolefins, glass, carbon, boron, and ceramics; and wherein the second portion includes a metal selected from a group consisting of alloys of titanium, alloys of aluminum, and alloys of iron.

* * * * *